No. 719,948. PATENTED FEB. 3, 1903.
L. W. MERRIAM.
APPARATUS FOR SEPARATING THE MEAT OF COTTON SEED FROM THE HULLS.
APPLICATION FILED AUG. 3, 1900.
NO MODEL.
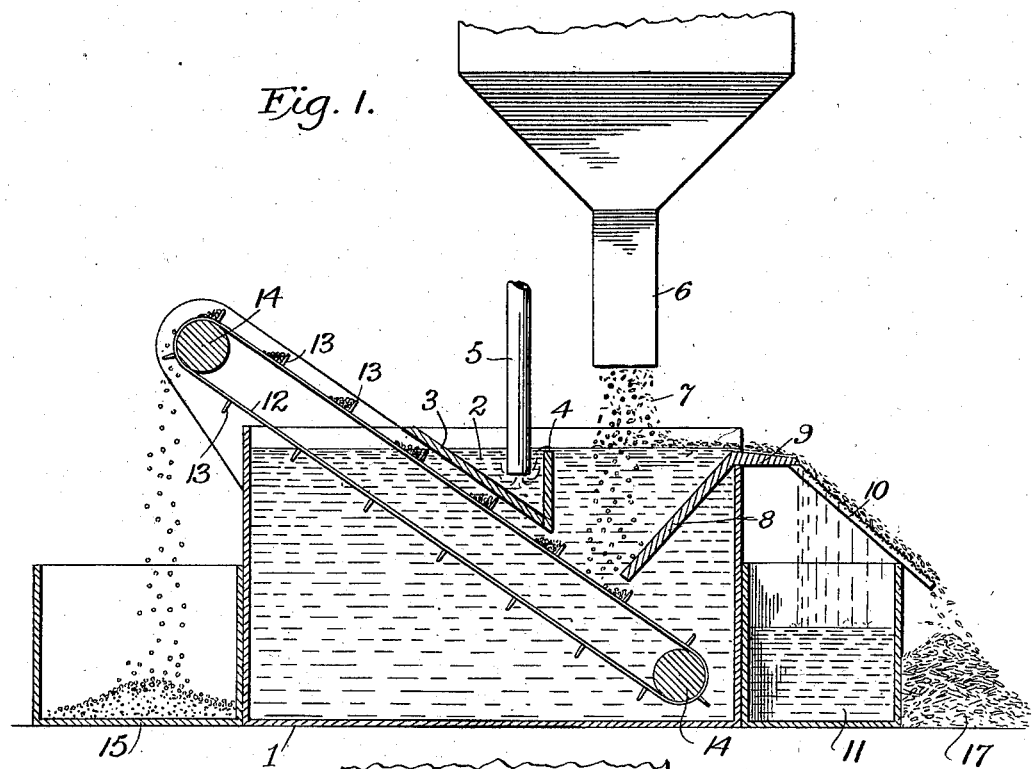
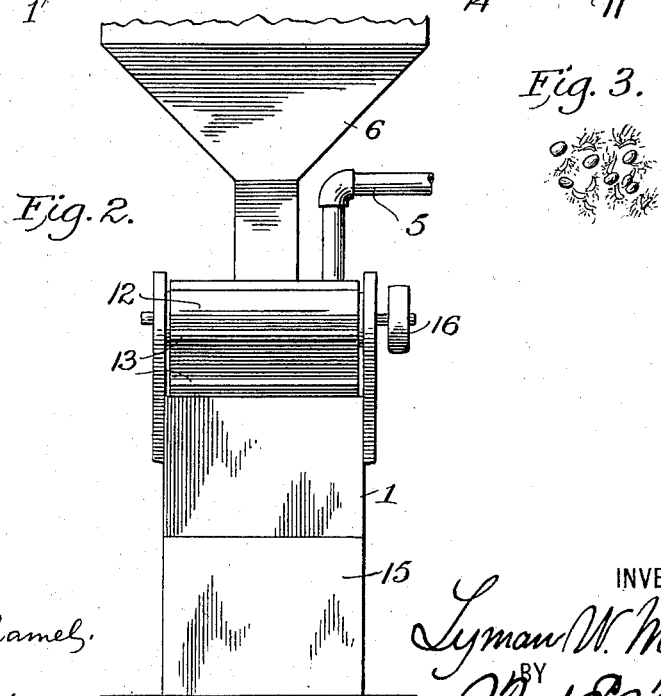
WITNESSES:
INVENTOR
Lyman W. Merriam
BY
Fred E. Tasker
ATTORNEY

UNITED STATES PATENT OFFICE.

LYMAN W. MERRIAM, OF FITCHBURG, MASSACHUSETTS, ASSIGNOR OF ONE-HALF TO GEORGE O. ALLEN, OF FITCHBURG, MASSACHUSETTS.

APPARATUS FOR SEPARATING THE MEAT OF COTTON-SEED FROM THE HULLS.

SPECIFICATION forming part of Letters Patent No. 719,948, dated February 3, 1903.

Application filed August 3, 1900. Serial No. 25,750. (No model.)

*To all whom it may concern:*

Be it known that I, LYMAN W. MERRIAM, a citizen of the United States of America, and a resident of Fitchburg, county of Worcester, State of Massachusetts, have invented certain new and useful Improvements in Apparatus for Separating the Meat of Cotton-Seed from the Hulls, of which the following is a specification.

This invention relates to an apparatus for separating the meat of cotton-seeds from the hulls, its object being to provide simple and efficient mechanism for receiving the mixed cotton-seed meats and hulls as they come from the huller or other machine and effectually separating them from each other.

The invention consists in certain details and peculiarities in the construction, arrangement, and combination of parts, substantially as will be hereinafter set forth and claimed.

In the annexed drawings, illustrating my invention, Figure 1 is a vertical section of my improved apparatus for separating the meat of cotton-seed from the hulls. Fig. 2 is an end elevation of the same. Fig. 3 is a view showing examples of cotton seed and hulls, the latter having more or less fuzz or cotton on them, which permit them to float.

Similar numerals of reference designate corresponding parts throughout the figures of the drawings.

It will be noticed that my invention is in no sense a huller or a delinter, but that it receives the mixture of meats and hulls after the seed has passed through the huller and had its meats or seed proper taken out of the hulls, although the two are not removed from each other's presence by the action of the huller.

1 denotes a tank or receptacle of suitable size which is filled with water, introduced thereinto by means of a supply-pipe 5, which delivers directly into a trough or compartment 2 at the upper end of the tank 1, which trough is formed by means of the inclined strip 2 and the vertical strip 4. Obviously the water coming through the supply-pipe 5 will first fill the trough 2 and, flowing over the edge of the vertical side of said trough, will fill tank 1, the object of the trough, therefore, being to cause the water to be constantly flowing or in motion.

Above the tank 1 is the mouth or spout 6, through which the mixture of cotton-seed meats and hulls is carried to my separating apparatus from the huller or other machine which has operated upon the cotton-seed to take the meats out of the hulls, although not to clean the meats by removing the hulls from the mixture. This mass of combined hulls and meats 7 falls upon the surface of the water in tank 1, and the meats consequently fall through the water toward the bottom of the tank. At the right-hand end of the tank is an inclined board 8, which is submerged and which leads downwardly from the surface of the water for a certain distance, as shown, said incline 8 having an outward inclined platform 9 projecting beyond the edge of the tank 1, as shown in Fig. 1. The delivery-point of the mixture of hulls and meats to the apparatus is between the trough 2 and the incline 8. When the meat portions of the cotton-seed fall through the water and descend toward the bottom of the tank 1, the hulls will float upon the surface of the water, and as this water is in constant motion and is flowing over the edge of the platform 9, in consequence of this platform being slightly lower than the water-level within the tank, the result is that the hulls are carried in the direction in which the water flows, and consequently are carried along onto and over the outer incline 9 and thence onto an inclined sieve 10, below which is a water-receptacle 11, which receives the water that flows through the meshes of the sieve, while the hulls themselves pass on down the inclined face of the sieve 10 and are discharged from the lower edge thereof in a heap at 17, or the water and hulls may be carried off together through a waste-pipe to any desired place. In the path that the meat portions of the seed would take in dropping vertically through the water of tank 1 from the spout 6 is an endless conveyer consisting of a belt 12, having at intervals thereon ledges or buckets 13 and passing around the pulleys or rollers 14, one of which is driven by the belt-pulley 16. The lower end of this conveyer is near the bottom of the tank, while the upper end is at a point outside of the latter and above a meat-receiving box or receptacle 15. Consequently since this inclined conveyer is constantly in motion the meats or seeds proper of the cottonseed as they fall through the water will be caught by the ledges or buckets 13 and carried upwardly to a point where they will, as the conveyer moves around its uppermost roller, be discharged from the conveyer into the box 15 or another conveyer to other machines or places. Thus it will be seen that in my improved apparatus the hulls are removed finally from the seeds by an operation which takes place subsequently to the operation of the hulling-machine, which aims only to dislodge the meat from its fixed position within the hull, but not to carry away the hull from the seed. I bring about the result that I have in view by using water in the manner stated, delivering it first into a tank and keeping the contents of the tank in perpetual circulation, so that there is a flow of water from the delivery-point to a point of discharge, and as the mixture of meats and hulls falls into this moving water the effectual separation of the two takes place in the manner described.

Having thus described my invention, what I claim as new, and desire to secure by Letters Patent, is—

1. In a device of the character described, the combination, with a tank, of means for delivering the material and water to the same, a conveyer to deliver the material from the tank, and an incline extending over the conveyer to direct the meat on the same and prevent the agitation of the water, and having a rearwardly-extending portion to direct the hulls from the receptacle.

2. In a device of the character described, the combination, with a tank, of means for delivering the material and water to the same, a conveyer to deliver the material from the tank, an incline adapted to direct the material on the conveyer and having a rearwardly-extending portion to direct the hulls from the receptacle, and a trough located over the conveyer to receive the water and discharge it in the direction of the feed.

3. In a device of the character described, the combination, with a tank, of means for delivering the material and water to the same, a belt to convey the material from the tank, a trough to receive the water and having its outlet in the direction of the feed, and an incline to direct the material on the belt and prevent agitation of the water by the same and having a rearwardly-extending portion to direct the hulls from the receptacle.

Signed at said Fitchburg this 13th day of July, 1900.

LYMAN W. MERRIAM.

Witnesses:
ALVAH M. LEVY,
EDITH A. HAVEN.